US012693782B2

(12) United States Patent
Jin et al.

(10) Patent No.: US 12,693,782 B2
(45) Date of Patent: Jul. 28, 2026

(54) COMPUTATIONAL STORAGE DEVICE, STORAGE SYSTEM INCLUDING THE SAME AND OPERATION METHOD THEREFOR

(71) Applicant: Samsung Electronics Co., Ltd., Suwon-si (KR)

(72) Inventors: Sang-Hwa Jin, Suwon-si (KR);
Min-Ho Kim, Suwon-si (KR);
Dongouk Moon, Suwon-si (KR);
Soo-Young Ji, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/922,592

(22) Filed: Oct. 22, 2024

(65) Prior Publication Data

US 2025/0044942 A1 Feb. 6, 2025

Related U.S. Application Data

(63) Continuation of application No. 18/312,817, filed on May 5, 2023, now Pat. No. 12,147,672.

(30) Foreign Application Priority Data

Aug. 4, 2022 (KR) ........................ 10-2022-0097484

(51) Int. Cl.
*G06F 12/00* (2006.01)
*G06F 3/06* (2006.01)
(52) U.S. Cl.
CPC .............. *G06F 3/061* (2013.01); *G06F 3/064* (2013.01); *G06F 3/0658* (2013.01); *G06F 3/0679* (2013.01)
(58) Field of Classification Search
None
See application file for complete search history.

(56) References Cited

U.S. PATENT DOCUMENTS 10,146,801 B2 12/2018 Savkli
10,169,485 B2 * 1/2019 Levin .................. G06F 16/9024
(Continued)

FOREIGN PATENT DOCUMENTS

KR 20160072305 A 6/2016
KR 102054068 B1 12/2019

OTHER PUBLICATIONS

Nassif, Roula, et al., "Multitask Learning Over Graphs: An Approach for Distributed, Streaming Machine Learning", IEEE Signal Processing Magazine, 37(3), 2020, 14-25.
(Continued)

*Primary Examiner* — Daniel D Tsui
(74) *Attorney, Agent, or Firm* — Wolf, Greenfield & Sacks, P.C.

(57) ABSTRACT

A computational storage device includes a control module, and a nonvolatile memory connected to the control module. The nonvolatile memory is configured to store a plurality of graph data elements, which comprises a plurality of nodes and a plurality of edges that connect at least a portion of the plurality of nodes to each other, in a first memory area and a second memory area each having a plurality of blocks and having different read speeds. The control module is configured to store a first graph data element of the plurality of graph data elements having a relatively high degree of association with one node of the plurality of nodes in the first memory area, and store a second graph data element of the plurality of graph data elements having a relatively low degree of association with the one node of the plurality of nodes in the second memory area.

20 Claims, 16 Drawing Sheets

(56) References Cited

U.S. PATENT DOCUMENTS

| | | | |
|---|---|---|---|
| 10,380,188 B2 | 8/2019 | Chen et al. | |
| 10,534,657 B2 | 1/2020 | Depner et al. | |
| 11,120,023 B2 | 9/2021 | Xia et al. | |
| 11,210,343 B2 | 12/2021 | Han et al. | |
| 2019/0361925 A1 | 11/2019 | Rogynskyy et al. | |
| 2020/0167426 A1* | 5/2020 | Scheideler | G06F 16/9024 |
| 2021/0400315 A1 | 12/2021 | Kale et al. | |
| 2022/0086455 A1 | 3/2022 | Muthiah | |
| 2024/0330260 A1* | 10/2024 | Xie | G06F 16/2462 |

OTHER PUBLICATIONS

Zhu, Guangming , et al., "Scene Graph Generation: A Comprehensive Survey", arXiv preprint arXiv:2201.00443, Jan. 27, 2022.

* cited by examiner

Graph

Graph

Graph

Figure 7:
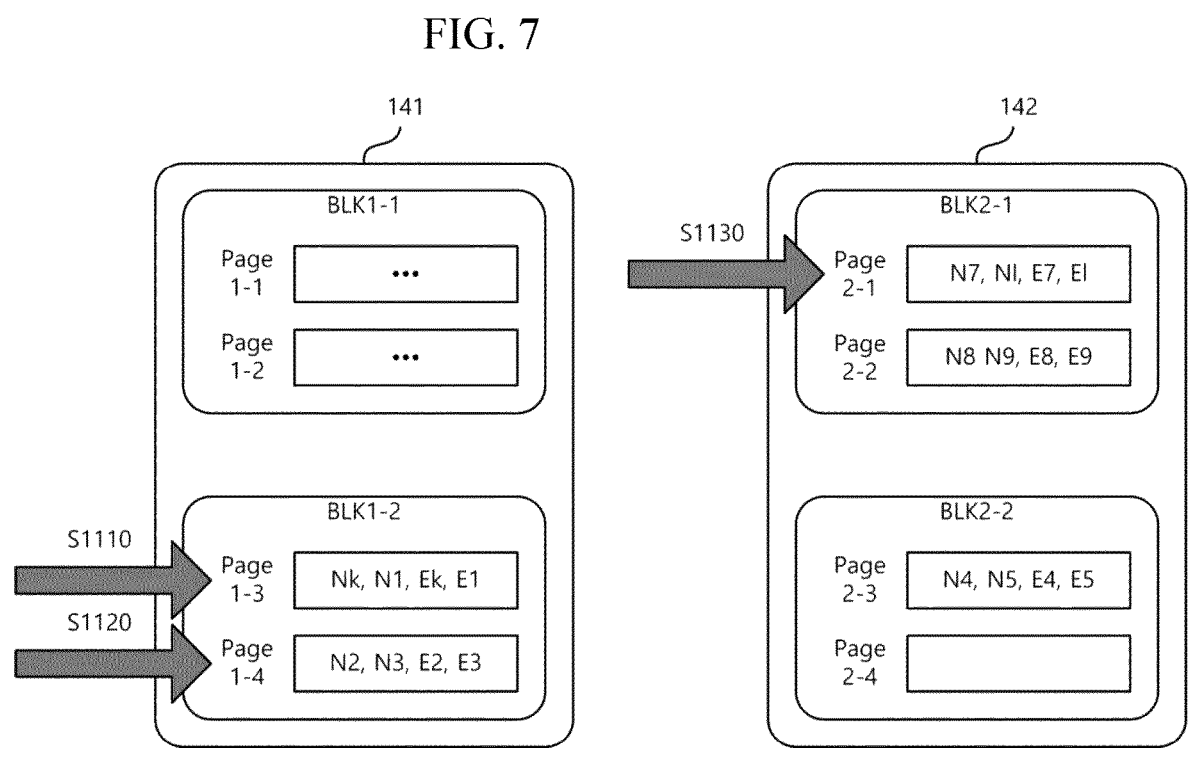

BLK1-1

Page 1-1 | • • •

Page 1-2 | • • •

S1130

BLK2-1

Page 2-1 | N7, NI, E7, EI

Page 2-2 | N8 N9, E8, E9

S1110

BLK1-2

Page 1-3 | Nk, N1, Ek, E1

S1120

Page 1-4 | N2, N3, E2, E3

BLK2-2

Page 2-3 | N4, N5, E4, E5

Page 2-4 |

FIG. 10

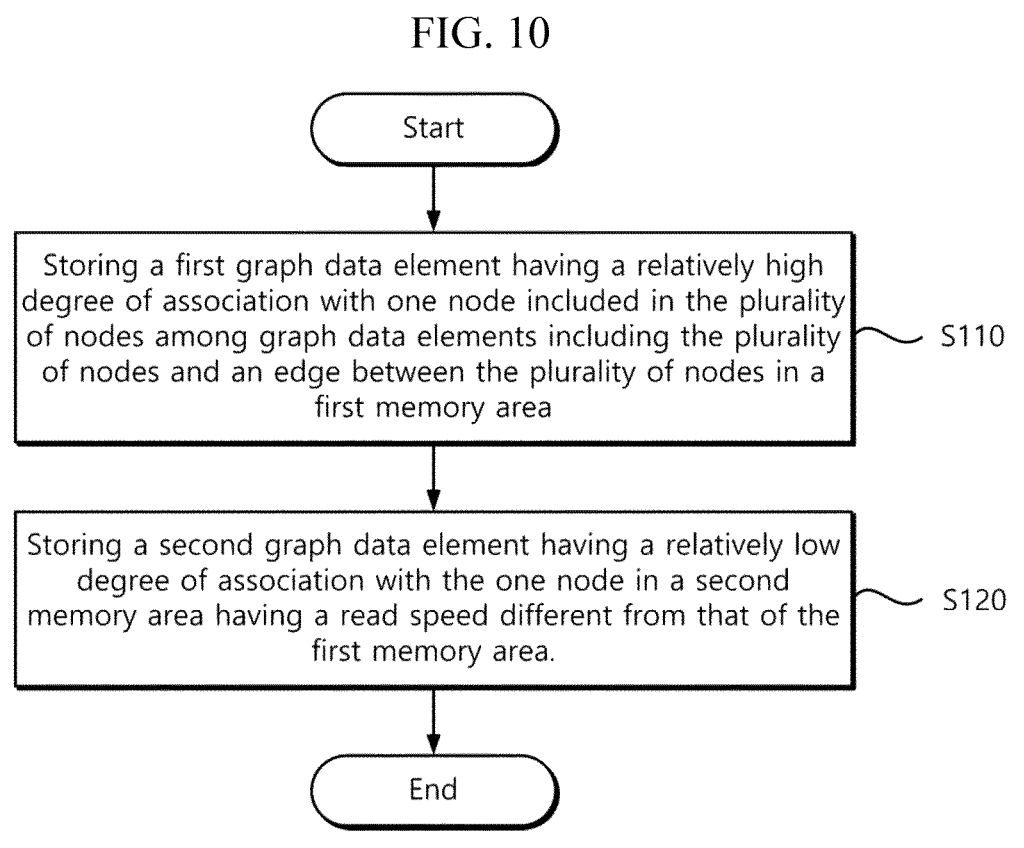

Start

Storing a first graph data element having a relatively high degree of association with one node included in the plurality of nodes among graph data elements including the plurality of nodes and an edge between the plurality of nodes in a first memory area ⟩~ S110

Storing a second graph data element having a relatively low degree of association with the one node in a second memory area having a read speed different from that of the first memory area. ⟩~ S120

End

Controller

Computing System

EX IF

100

Computational Storage
Device

COMPUTATIONAL STORAGE DEVICE, STORAGE SYSTEM INCLUDING THE SAME AND OPERATION METHOD THEREFOR

CROSS-REFERENCE TO RELATED APPLICATIONS

This application is a continuation of U.S. patent application Ser. No. 18/312,817, filed May 5, 2023, which claims priority under 35 U.S.C. § 119 to Korean Patent Application No. 10-2022-0097484, filed Aug. 4, 2022, in the Korean Intellectual Property Office, the disclosures of which are incorporated by reference herein in their entireties.

BACKGROUND

Embodiments of the present disclosure relate to a computational storage device, a storage system including the same, and a method of operating the same.

As some applications may require a large amount of data processing, computational storage devices have been developed in which some of the computational functions performed by an existing host are offloaded to a storage device. The computational storage devices may store data according to the computation in a nonvolatile memory (NVM). However, the conventional computational storage devices sequentially typically store data in the nonvolatile memory without considering the inherent characteristics of the nonvolatile memory.

SUMMARY

Embodiments of the present disclosure may provide a computational storage device that is configured to provide artificial intelligence and data storage functionality based on the characteristics of a nonvolatile memory, a storage system including the same, and a method of operating the same.

According to an embodiment of the present disclosure, a computational storage device includes a control module, and a nonvolatile memory connected to the control module. The nonvolatile memory being configured to store a plurality of graph data elements, which comprises a plurality of nodes and a plurality of edges that connect at least a portion of the plurality of nodes to each other, in a first memory area and a second memory area each having a plurality of blocks and having different read speeds. The control module is configured to store a first graph data element of the plurality of graph data elements having a relatively high degree of association with one node of the plurality of nodes in the first memory area, and is configured to store a second graph data element of the plurality of graph data elements having a relatively low degree of association with the one node of the plurality of nodes in the second memory area.

According to an embodiment, a read speed in the first memory area may be faster than a read speed in the second memory area.

According to an embodiment, the control module may be configured to cluster the plurality of graph data elements into a plurality of groups based on the degree of association, the first graph data element may be included in a first one of the plurality of groups that includes the one node of the plurality of nodes, and the second graph data element may be included in a second one of the plurality of groups.

According to an embodiment, the control module may be further configured to train an artificial intelligence model based on the plurality of graph data elements, and may be further configured to store a graph data element of the plurality of graph data elements having a relatively high update frequency in a designated block of the plurality of blocks based on training of the artificial intelligence model.

According to an embodiment, the control module may be further configured to store a graph data element of the plurality of graph data elements in at least one reservation page included in the designated block based on training the artificial intelligence model.

According to an embodiment, the designated block may be included in the first memory area.

According to an embodiment, when training the artificial intelligence mode, the control module may be further configured to read a plurality of first pages included in the first memory area, and may be further configured to sequentially read a plurality of second pages included in the second memory area.

According to another embodiment of the present disclosure, a method of operating a computational storage device includes storing a first graph data element of a plurality of graph data elements, the plurality of graph data elements comprising a plurality of nodes and a plurality of edges that connect at least a portion of the plurality of nodes to each other, having a relatively high degree of association with one node of the plurality of nodes in a first memory area, and storing a second graph data element of the plurality of graph data elements having a relatively low degree of association with the one node of the plurality of nodes in a second memory area having a read speed different from that of the first memory area.

According to an embodiment, a read speed in the first memory area may be faster than a read speed in the second memory area.

According to another embodiment of the present disclosure, a storage system includes an external device that is configured to replace a storage medium with a computational storage device. The computational storage device includes: a control module, and a nonvolatile memory connected to the control module. The nonvolatile memory is configured to store a plurality of graph data elements, which comprises a plurality of nodes and a plurality of edges that connect at least a portion of the plurality of nodes to each other, in a first memory area and a second memory area each having a plurality of blocks and having different read speeds. The control module is configured to store a first graph data element of the plurality of graph data elements having a relatively high degree of association with one node of the plurality of nodes in the first memory area, and is configured to store a second graph data element of the plurality of graph data elements having a relatively low degree of association with the one node of the plurality of nodes in the second memory area.

BRIEF DESCRIPTION OF THE FIGURES

A detailed description of each drawing is provided to facilitate a more thorough understanding of the drawings referenced in the detailed description of the present disclosure.

FIGS. 6 and 7 are diagrams that illustrate a read operation of an NVM, according to an embodiment of the present disclosure.

FIG. 10 is a flowchart that illustrates a method of operating a computational storage device, according to an embodiment of the present disclosure.

FIG. 13 is a diagram that illustrates a computational storage device, according to another embodiment of the present disclosure.

FIG. 16 is a diagram that illustrates a storage system, according to another embodiment of the present disclosure.

DETAILED DESCRIPTION

Figure 1:
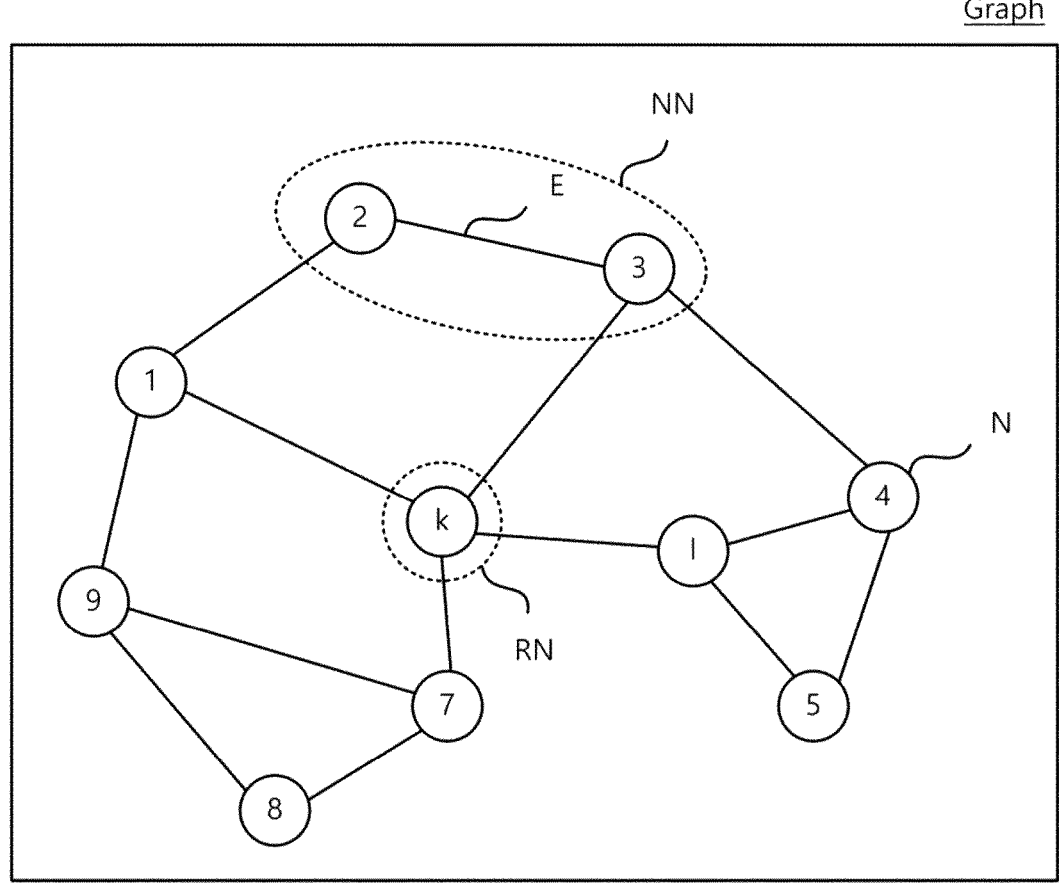
FIG. 1 is a diagram illustrating a graph defined in a GNN.

Various example embodiments will be described more fully with reference to the accompanying drawings, in which embodiments are shown. The present disclosure may, however, be embodied in many different forms and should not be construed as limited to the embodiments set forth herein. Like reference numerals refer to like elements throughout this application. As used herein, the term "and/or" includes any and all combinations of one or more of the associated listed items. It is noted that aspects described with respect to one embodiment may be incorporated in different embodiments although not specifically described relative thereto. That is, all embodiments and/or features of any embodiments can be combined in any way and/or combination.

Embodiments of the inventive concept are described herein in the context of an Artificial Intelligence (AI) system, which uses multi-layer neural network technology. Moreover, it will be understood that the multi-layer neural network is a multi-layer artificial neural network comprising artificial neurons or nodes and does not include a biological neural network comprising real biological neurons. The multi-layer neural network described herein may be configured to transform a memory of a computer system to include one or more data structures, such as, but not limited to, arrays, extensible arrays, linked lists, binary trees, balanced trees, heaps, stacks, and/or queues. These data structures can be configured or modified through the AI training process to improve the efficiency of a computer system when the computer system operates in an inference mode to make an inference, prediction, classification, suggestion, or the like.

Various embodiments of the present disclosure may be applied to various applications that use big data processing, such as, for example, a database application, graph processing, artificial intelligence learning, or statistical analysis. For example, for artificial intelligence prediction and classification, various kinds of artificial intelligence models or networks, such as a Graph Neural Network (GNN), a Convolution Neural Network (CNN), a Region with Convolution Neural Network (R-CNN), a Region Proposal Network (RPN), a Recurrent Neural Network (RNN), a Stacking-based deep Neural Network (S-DNN), a State-Space Dynamic Neural Network (S-SDNN), a Deconvolution Network, a Deep Belief Network (DBN), a Restricted Boltzman Machine (RBM), a Fully Convolutional Network, a Long Short-Term Memory (LSTM) Network, a Classification Network, etc. may be used Hereinafter, the present disclosure will be described based on a GNN among the various applications described above, but various embodiments of the present disclosure are not necessarily limited to use of a GNN.

GNN

FIG. 1 is a diagram illustrating a graph defined in a GNN.

Referring to FIG. 1, a graph is a set of structured information including a node 'N' (or a vertex) and an edge 'E'. At least two nodes are connected through the edge 'E'. A node value corresponding to the node 'N' may represent an entity or an attribute, and an edge value corresponding to the edge 'E' may represent a relationship between nodes 'N' connected to the edge 'E'. The edge 'E' may or may not include a direction, and when the edge 'E' includes a direction, the graph may be unidirectional or bidirectional. When a distance (hop) between nodes 'N', that is, an edge distance is the same, they may be included in the same GNN layer. In the present disclosure, data including the above-described node 'N' and the edge 'E' are referred to as a graph data element GDE. In addition to nodes and edges, a graph may include additional information, such as global-context, which provides information on the general environment or subject matter that the graph represents, and connectivity, which provides information on how connected one node is to another. All four types of information may be viewed as features of the graph and embedding vectors may be generated for these features and used to train the GNN. When the GNN operates in inference, prediction, or classification mode, then embeddings for current information corresponding to these various features may be generated to create vectors that are processed by the GNN to make the inference, prediction, or classification. Training of the GNN will be described hereafter.

The GNN may include an algorithm for training a structure of the graph described above. The GNN may include two components of an 'aggregation' and a 'combination'. The aggregation generates node embeddings corresponding to the aggregated node features by aggregating features of neighboring nodes 'NN' of a target node 'RN'. The combination generates node embeddings for the target node 'RN' by transferring all the node features aggregated with respect to the target node 'RN' to a trainable layer.

The aggregation and the combination may be performed at each layer included in the GNN to be trained. In terms of layers, the aggregation may be defined as combining hidden states of neighboring nodes NNs of (k-1)-th time (where 'k' is a natural number in an iteration order) with respect to the target node 'RN', and, the combination may be defined as updating the hidden state of the target node 'RN' at k-th time by using the hidden state of the target node RN at the (k-1)-th time and the aggregated information.

The GNN is configured to generate node embeddings for each target node 'RN' through the above-described operation, and to generate output data using the generated node embeddings as input data of the GNN. The GNN may be trained through back propagation, and in the training process, weight and bias values defined in each layer of the GNN and graph data elements, such as the above-described node features, hidden states, or node embeddings, may be updated. In the graph data element, an updated value (e.g., k-th time) as well as a value (e.g., (k-1)-th time) before the update may be stored in the memory during the computation process.

Computational Storage Device

Figure 2:
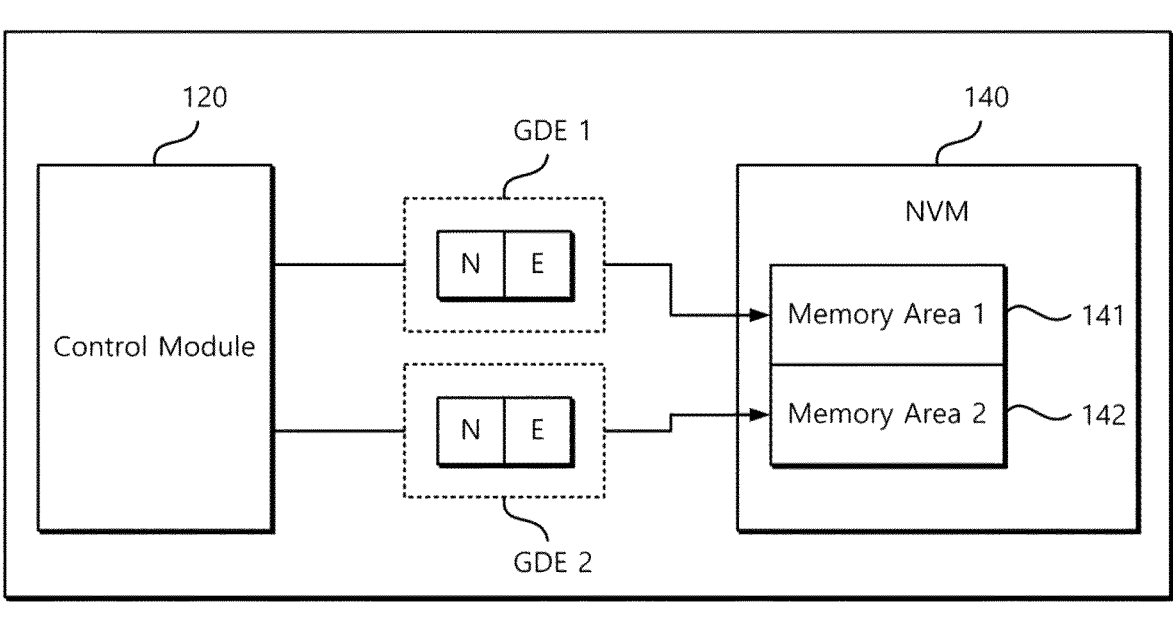
FIG. 2 is a diagram illustrating a computational storage device, according to an embodiment of the present disclosure.

FIG. 2 is a diagram illustrating a computational storage device, according to an embodiment of the present disclosure.

Refer to FIG. 2, a computational storage device 100 may be configured to perform a computational operation according to the above-described GNN, and may be configured to store a graph data element for each node in the computational process. Also, when the graph data element is updated, the updated value may be stored.

The computational storage device 100 includes a control module 120 and a nonvolatile memory connected to the control module 120, that is, an NVM 140.

The NVM 140 includes a first memory area 141 and a second memory area 142 having different read speeds. According to an embodiment, the first memory area 141 may have a faster read speed than that of the second memory area 142.

In an embodiment, each of the first memory area 141 and the second memory area 142 may be implemented in a single memory chip. For example, the first memory area 141 and the second memory area 142 may correspond to some blocks or pages of a single memory chip. In this case, the number of bits writable in each memory cell included in the first memory area 141 may be different from the number of bits writable in each memory cell included in the second memory area 142. For example, the first memory area 141 may be a single level cell (SLC) area, and the second memory area 142 may be a multi-level cell (MLC) area or a triple level cell (TLC) area. As another example, the first memory area 141 may be a fast SLC area, and the second memory area 142 may be a slow SLC area.

The NVM 140 is configured to store the graph data elements including the above-described plurality of nodes and edges between the plurality of nodes in response to the operation of the control module 120.

The control module 120 may be configured to perform a computational operation according to the GNN and may be configured store the graph data elements for each node in the computational process. According to an embodiment, the control module 120 may be configured to perform various operations according to the above-described GNN, and may be configured to store the computed graph data elements in the NVM 140. In addition, when the graph data element is updated in the learning process of the GNN, the updated value may be stored in the NVM 140.

Figure 3:
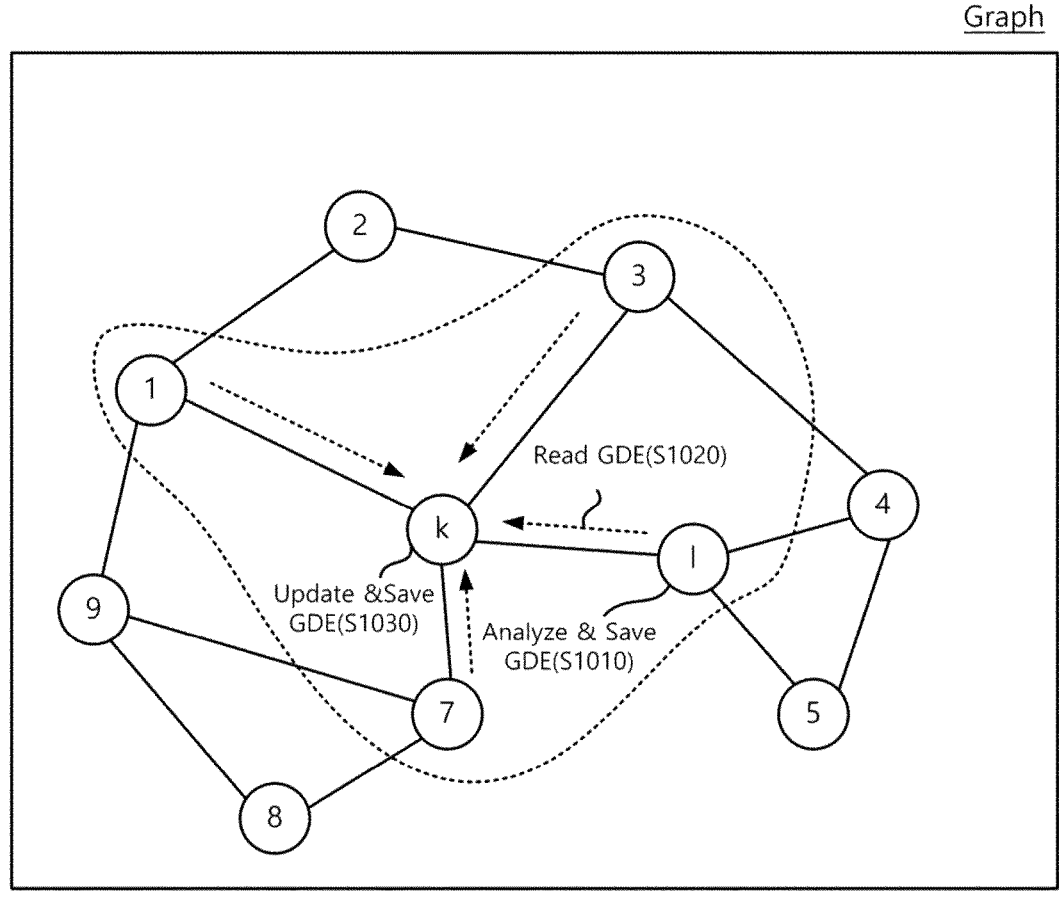
FIG. 3 is a diagram illustrating a graph processing operation of a control module, according to an embodiment of the present disclosure.

FIG. 3 is a diagram illustrating a graph processing operation of a control module, according to an embodiment of the present disclosure.

Referring to FIG. 3, the control module 120 may be configured to process a graph including the graph data element described above, and may be configured to generate output data associated with a target node included in the graph based on, for example, the GNN. As described above, the GNN includes layers each classified into the same hop. In FIG. 3, when a target node is 'k', it is illustrated based on a layer having a hop closest to the target node.

To perform an operation according to the GNN on the target node, the control module 120 first analyzes the features (or node embeddings) of each of neighboring nodes 1, 3, 7, and '1' located in the hop closest to the target node, and stores the analyzed results in the NVM 140 (S1010). The analysis of the features of the neighboring nodes 1, 3, 7, and '1' may correspond to the above-described aggregation operation, and for example, it may be understood as generating the features of each of the neighboring nodes 1, 3, 7, and '1', based on the features of other neighboring nodes connected to each of the neighboring nodes 1, 3, 7, and '1'. The control module 120 stores the features generated according to the analysis in the NVM 140.

When the features of each of the neighboring nodes 1, 3, 7, and '1' are generated and stored, the control module 120 may read the generated features (S1020).

The control module 120 updates a feature of the target node based on the read feature (S1030). Also, the control module 120 may store the updated feature of the target node in the NVM 140.

According to an embodiment, when a graph data element, such as features generated according to analysis or update operations is stored in the NVM 140, the control module 120 may store the graph data element based on the degree of association between nodes. The control module 120 clusters the graph, which is input data of the GNN based on the degree of association, to store the graph data element in the NVM 140 according to the degree of association, and determines the degree of association between nodes using clusters classified by the clustering.

Figure 4:
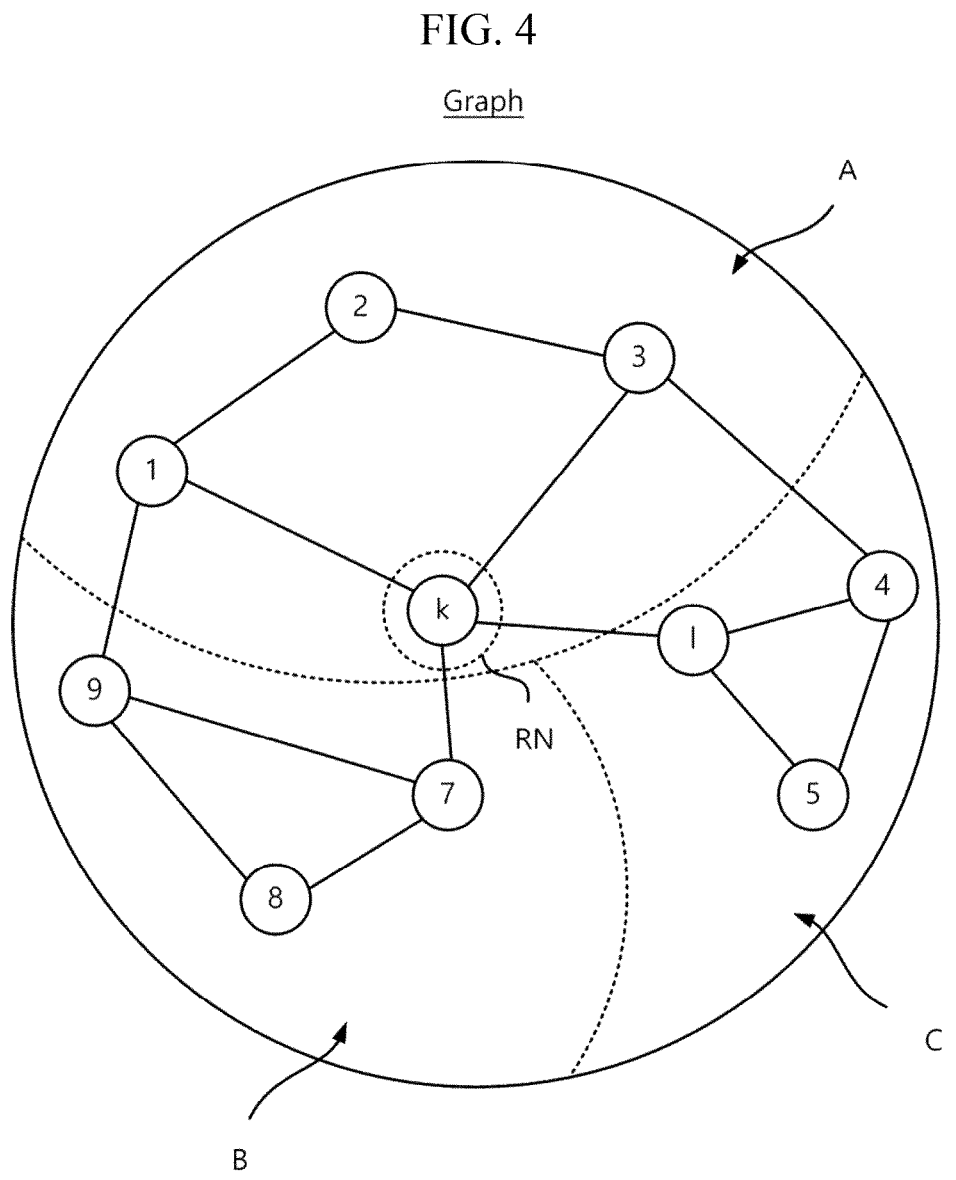
FIG. 4 is a diagram illustrating a clustered graph, according to an embodiment of the present disclosure.

FIG. 4 is a diagram illustrating a clustered graph, according to an embodiment of the present disclosure.

Referring to FIG. 4, a graph including a plurality of nodes and an edge connected between at least two nodes may be classified into a plurality of groups A to C according to the degree of association between the nodes. For example, in FIG. 4, nodes having high degree of association to 'k', which is the target node Rn, may be 1 to 3, nodes having relatively low degree of association to 'k' may be 7 to 9, and nodes having the lowest degree of association may be '1', 4, and 5.

The control module 120 may be configured to cluster the graph based on various methods. According to an embodiment, the control module 120 may be configured to cluster the graph using a differentiable cost function that is associated with each node and is a convex function. For example, when the cost function is defined as any parameter wk that may be defined as a distance between nodes, a weight, an edge, or a cost, the control module 120 searches for the parameter wk that can minimize the cost function to cluster the graph. For example, nodes having the same parameter wk may be classified into the same group.

When a certain node is included in the same group 'A' as the target node 'RN' in a group classified through clustering, the control module 120 may be configured to determine that the node has a relatively high degree of association with the target node 'RN', and when the certain node is included in other groups 'B' and 'C', the control module 120 may determine that the node has a relatively low degree of association with the target node 'RN'.

When nodes and edges are classified according to the degree of association, graph data elements including the nodes and the edges may also be classified. For example, the graph data elements may be classified into a graph data element (hereinafter, a first graph data element (GDE 1)) including nodes and edges included in the group 'A' including the target node 'RN' and a graph data element (hereinafter, a second graph data element (GDE 2)) including nodes and edges included in the remaining groups 'B' and 'C'.

According to an embodiment, the control module 120 be configured to store in the first memory area 141, a first graph data element GDE 1 having a relatively high degree of association with one node included in a plurality of nodes among the graph data. The control module 120 be configured to store, in the second memory area 142, the second graph data element GDE 2 having a relatively low degree of association with one node.

Figure 5A:
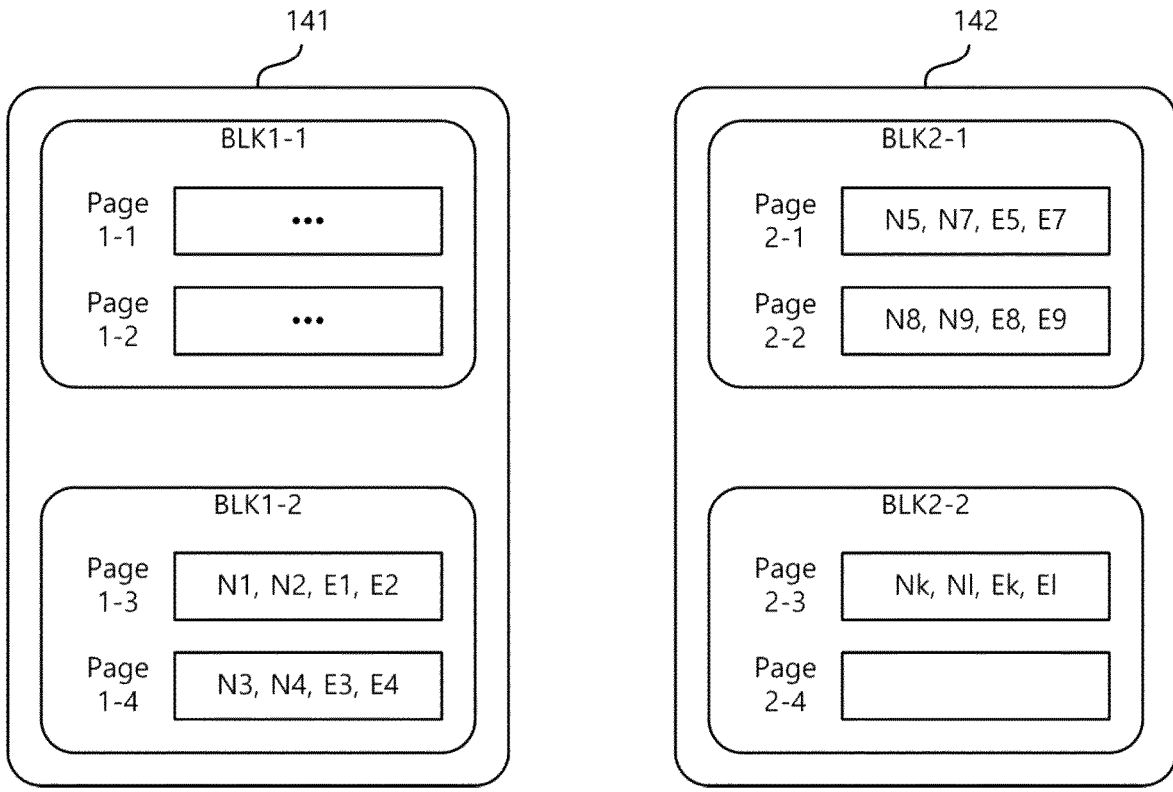
FIGS. 5A and 5B are diagrams that illustrate a store operation of a control module, according to an embodiment of the present disclosure.
Figure 5B:
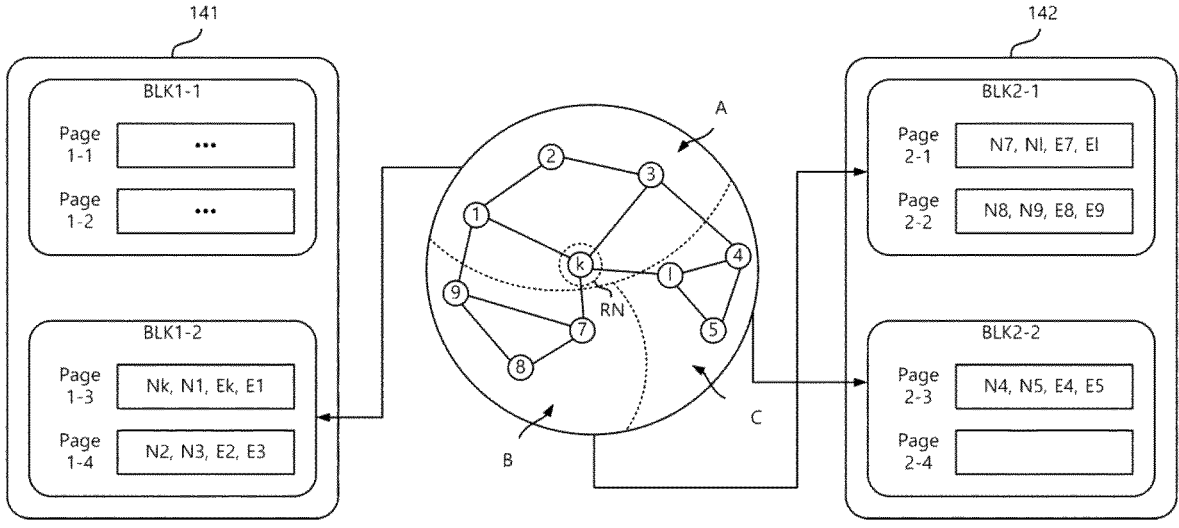

FIGS. 5A and 5B are diagrams that illustrate a store operation of a control module, according to an embodiment of the present disclosure. In FIGS. 5A and 5B, each of the first and second memory areas 141 and 142 may include a plurality of blocks, and each block may include a plurality of pages.

Referring to FIG. 5A, the control module 120 according to an embodiment may sequentially store the graph data elements in the first memory area 141 and the second memory area 142 in the order of the index of nodes. In other embodiments, the control module 120 may store the graph data elements in the order of nodes processed in the GNN. For example, as illustrated, the first memory area 141 includes 1-1 block BLK 1-1 to 1-2 block BLK 1-2, and the second memory area 142 may include 2-1 block BLK 2-1 to 2-2 block BLK 2-2, and each block may include a plurality of pages.

In this case, when the 1-2 block BLK 1-2, the 2-1 block BLK 2-1, and the 2-2 block BLK 2-2 are available, the control module 120 may sequentially store the graph data elements in the 1-2 block BLK 1-2, the 2-1 block BLK 2-1, and the 2-2 block BLK 2-2. For example, the control module 120 may store the graph data elements associated with nodes 1 and 2 in the 1-3 page included in the 1-2 block BLK 1-2 in the first memory area 141. Thereafter, the control module 120 stores the graph data elements associated with the nodes 5 and 7 in the 2-1 page included in the 2-1 block BLK 2-1 in the second memory area 142, stores the graph data elements associated with nodes 8 and 9 in the 2-2 page, and stores the graph data elements associated with node 'k' and node 'l' in page 2-3 included in the 2-2 block BLK 2-2.

Referring to FIG. 5B, the control module 120 according to an embodiment stores graph data elements based on the clustered graph. For example, when the nodes included in the graph are classified into group 'A' including the target node and the remaining groups, group 'B' and group 'C', the control module 120 determines that the node 'k', the node '1', the node '2', and the node '3' included in the group 'A' are nodes having the high degree of association and stores the graph data elements in the first memory area 141. The control module 120 determines that the remaining graph data elements are nodes with low degree of association and stores them in the second memory area 142.

Figure 6:
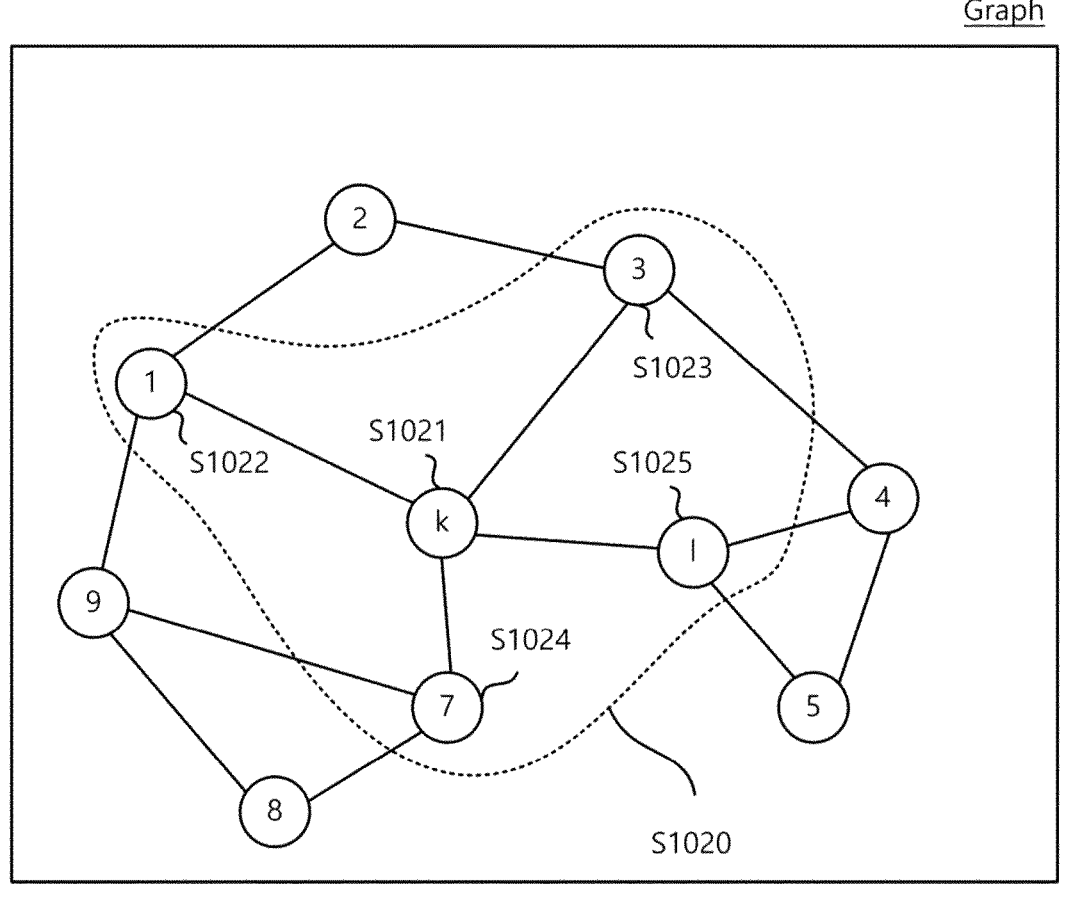

FIGS. 6 and 7 are diagrams that illustrate a read operation of an NVM according to an embodiment.

Referring to FIG. 6, the control module 120 according to an embodiment may read a plurality of first pages (1-1 page to 1-4 page) included in the first memory area when training the artificial intelligence model, and may sequentially read a plurality of second pages (2-1 page to 2-4 page) included in the second memory area.

For example, a case in which the control module 120 sequentially reads graph data elements from the neighboring nodes 1, 3, 7, and 'l' of the target node to update the feature of the target node 'k' may be considered. That is, the control module 120 may first read the graph data element from the target node 'k' (S1021), then may read the graph data element from the subsequent neighboring node 1 (S1022), then may read the graph data element from the subsequent neighboring node 3 (S1023), then may read the graph data element from the subsequent neighboring node 7 (S1024), and finally, then may read the graph data element from the last neighboring node 'l' (S1025).

In this case, according to an embodiment, as illustrated in FIG. 7, when the graph data elements are stored in the first memory area 141 and the second memory area 142 according to the degree of association with the target node as described above (FIG. 5B), the read operation of the NVM 140 may be decreased or simplified compared to when the graph data elements are sequentially stored (FIG. 5A). For example, when graph data elements of nodes 1, 3, 5, 7, 'l', and 'k' to be read are simply sequentially stored in each page as illustrated in FIG. 5A, at least four page read operations are used to update the feature of the target node 'k'. In contrast, when the graph data elements are stored according to the degree of association as illustrated in FIGS. 5B and 7, target node analysis is possible with fewer page read operations by reading (S1110) the 1-3 page in which the nodes 'k' and 1 are stored, reading (S1120) the 1-4 page in which the node 3 is stored, and reading (S1130) the 2-1 page in which nodes 7 and 'l' are stored.

Figure 8:
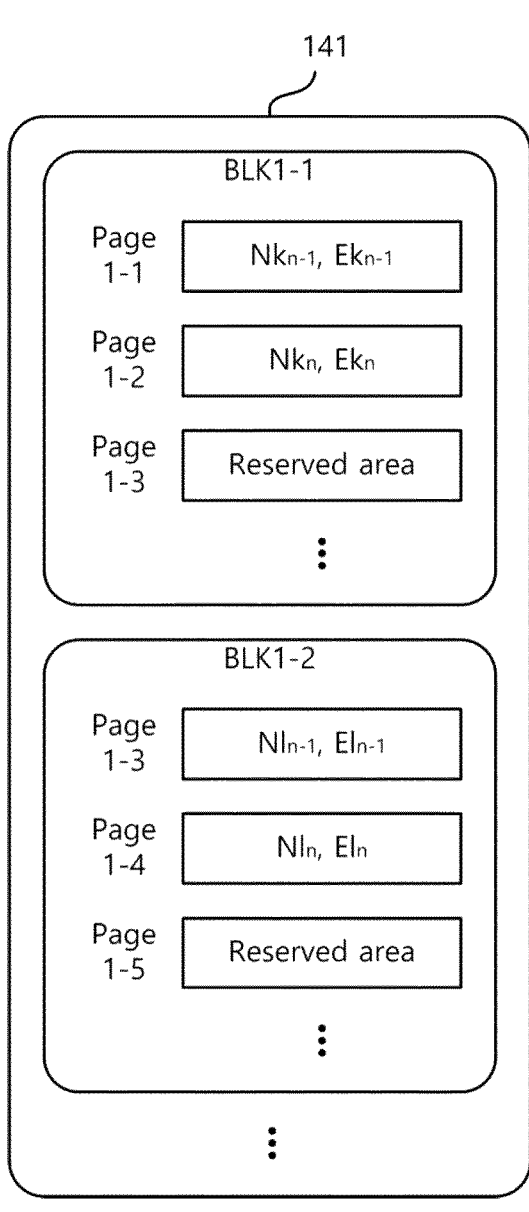
FIG. 8 is a diagram that illustrates a store operation of a control module, according to an embodiment of the present disclosure.

FIG. 8 is a diagram that illustrates a store operation of a control module, according to an embodiment of the present disclosure.

Referring to FIG. 8, according to an embodiment, the control module 120 may store, in particular, graph data elements for which updates may occur frequently among the graph data elements for each of the plurality of nodes included in the graph, in a designated block, during the training process of artificial intelligence models, such as the GNN described above.

For example, when the graph data element of node 'k' has a relatively high update frequency according to training among nodes 'k' and 'l' included in the graph, the control module 120 stores the graph data element of the node 'k' in the designated block, and stores the graph data element of the other node 'l' in the remaining blocks except for the designated block. The designated block may be designated according to the update frequency of graph data elements, the size of a page, block, or super block included in the NVM 140, etc. The control module 120 may designate a block according to an embodiment, or the block may be designated by a host. A plurality of designated blocks may be designated by including blocks in which graph data elements of nodes with high stored frequency are to be copied through garbage collection.

The designated block may include a plurality of pages as illustrated, and for example, may include a reserved area such as the 1-3 page, that is, a reserved page. The control module 120 may store the graph data element of node 'k', which are continuously updated according to training, in a designated block, and may store the graph data element to be updated later (e.g., the (k+1)-th update time) in the reserved area. In other embodiments, the control module 120 may store graph data elements of other nodes with high update frequency in the reserved area.

After the graph data elements are stored in the NVM 140, data stored in each block may be erased through a storage controller connected to the NVM 140. An erase operation is performed in units of blocks. The erase operation may be performed, for example, in garbage collection in which valid data stored in a block are copied to another block and then data of the existing block are erased.

Figure 9:
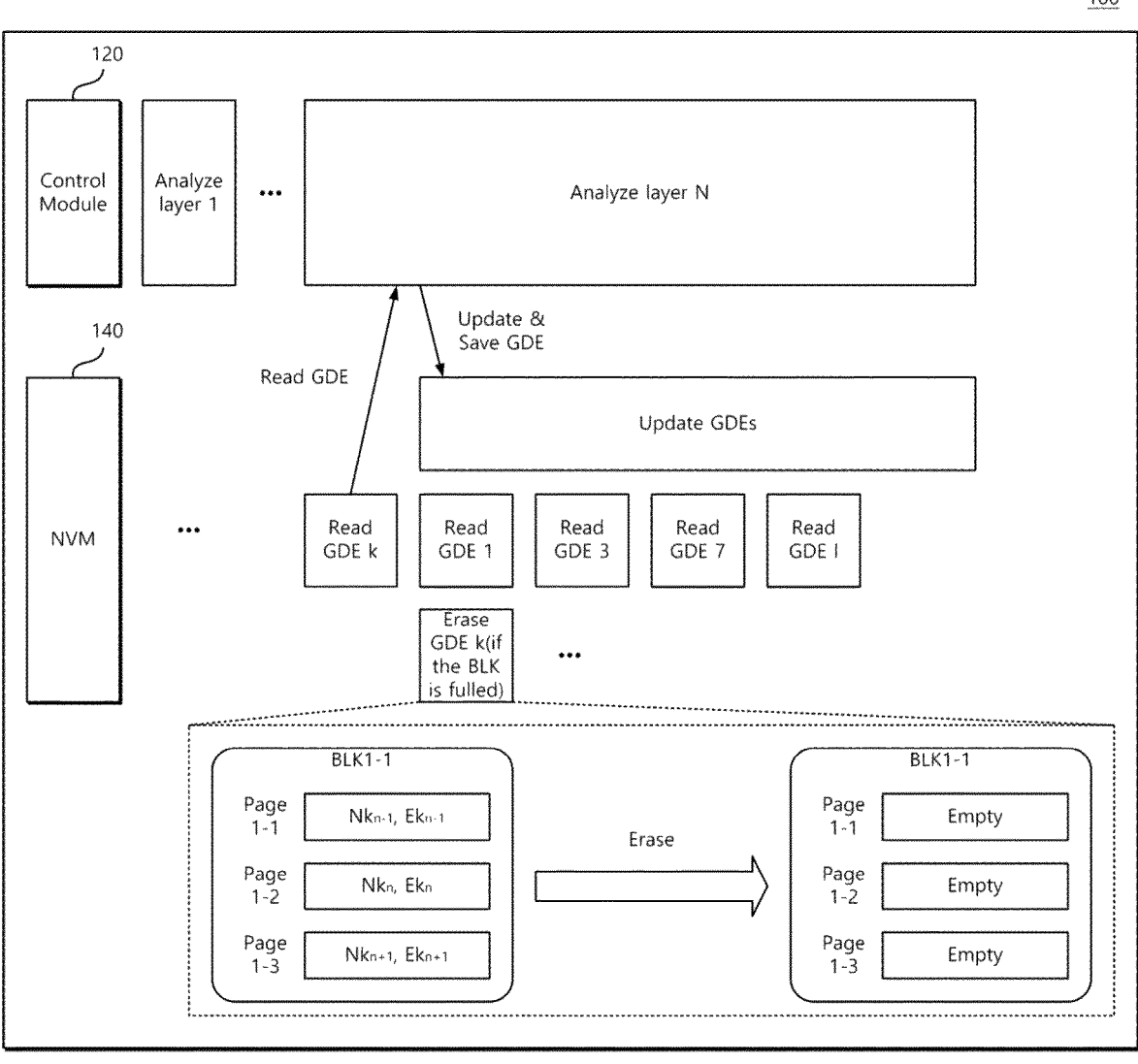
FIG. 9 is a diagram that illustrates operations for analyzing a GNN using a control module, according to an embodiment of the present disclosure.

FIG. 9 is a diagram that illustrates operations for analyzing a GNN using a control module, according to an embodiment of the present disclosure.

Referring to FIG. 9, the control module 120 may sequentially analyze (e.g., learning) each layer included in the GNN as described above, and may store data generated according to the analysis, that is, graph data elements in the NVM 140. The layer may include a layer having the highest number of hops from a layer having the lowest number of hops from the target node, or may include a neural network layer corresponding to a classifier or a predictor after generating node embeddings.

Regardless of which type of layer is included, the control module 120 reads the graph data elements stored in the NVM 140 in each layer, analyzes the layers based on the read graph data elements, and stores the graph data elements updated according to the analysis in the NVM 140. Thereafter, when the block in which the updated graph data elements are stored is full, overwriting is not allowed due to the characteristics of the NVM 140, so the garbage collection through an erase operation may be performed.

In this case, according to an embodiment, when the control module 120 separately stores graph data elements with high update frequency in a designated block, block-based operations, such as the garbage collection, are performed for each designated block and the remaining block units, so the number of operations of the block unit and thus input/output latency may be decreased. For example, when graph data elements with various update frequencies are stored in a block without distinction, the garbage collection may occur frequently due to graph data elements with high update frequency even though graph data elements with low update frequency are included. However, according to an embodiment, when graph data elements having a high update frequency are separately stored in a designated block, the number of garbage collection operations may be reduced.

In the above descriptions, various embodiments related to the computational storage device 100 of the present disclosure have been described. According to embodiments, in consideration of the characteristics of the NVM 140 that read/write operations are possible in units of pages and erase operation is possible in units of blocks, because data generated according to various computational processing operations, such as the GNN, are stored in the NVM 140, the number of page read operations or garbage collection operations may be decreased, and thus the efficiency of computational operations may be increased.

FIG. 10 is a flowchart illustrating a method of operating a computational storage device, according to an embodiment of the present disclosure.

Referring to FIG. 10, in S110, the computational storage device 100 stores the first graph data element GDE 1, which has a relatively high degree of association with one node included in a plurality of nodes among graph data elements including a plurality of nodes and one or more edges between the plurality of nodes, in the first memory area 141.

In S120, the computational storage device 100 stores the second graph data element GDE 2, which has a relatively low degree of association with the one node, in the second memory area 142 having a different read speed from that of the first memory area 141.

For example, the first memory area 141 may have a faster read speed than the second memory area 142. That is, the first graph data element GDE 1 having a relatively high degree of association is stored in the first memory area 141 having the high read speed, and the second graph data element GDE 2 having a relatively low degree of association is stored in the second memory area 142 having the low read speed.

Figure 11:
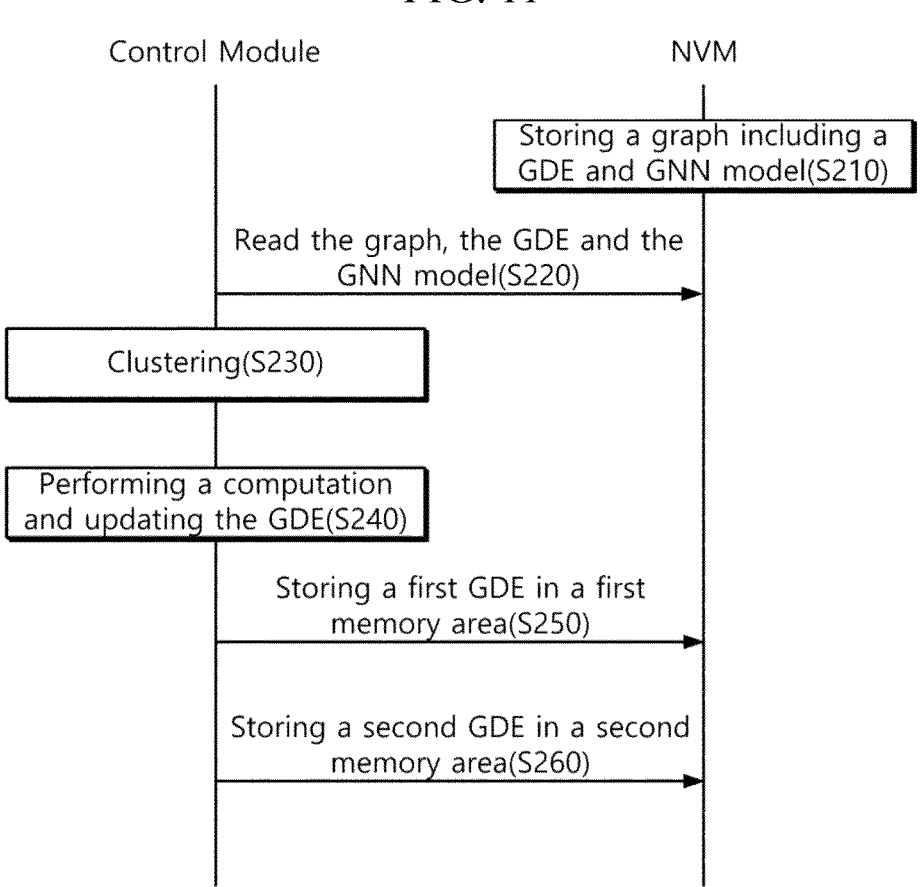
FIG. 11 is a flowchart that illustrates a method of operating a computational storage device, according to another embodiment of the present disclosure.

FIG. 11 is a flowchart illustrating a method of operating a computational storage device, according to another embodiment of the present disclosure.

Referring to FIG. 11, in S210, the NVM 140 stores a graph including graph data elements and a GNN model. Although not illustrated, operation S210 may be performed, for example, through a host connected to the computational storage device 100 through an interface.

In S220, the control module 120 reads the graph and graph data elements stored in the NVM 140.

In S230, the control module 120 clusters the graph and classifies a plurality of nodes included in the graph to be included in one of a plurality of groups. As described above, clustering may be performed based on the degree of association between nodes, and nodes having a relatively high degree of association with the target node may be included in a group including the target node.

In S240, the control module 120 performs a computation and updates the graph data element. For example, the computation may include various operations such as artificial intelligence training including the above-described GNN or the graph processing.

In S250, the control module 120 stores the first graph data element GDE 1 classified as having high degree of association with the target node among the updated graph data elements in the first memory area 141 having a high read speed.

In S260, the control module 120 stores the second graph data element GDE 2 classified as having low degree of association with the target node among the updated graph data elements in the second memory area 142 having a low read speed.

Figure 12:
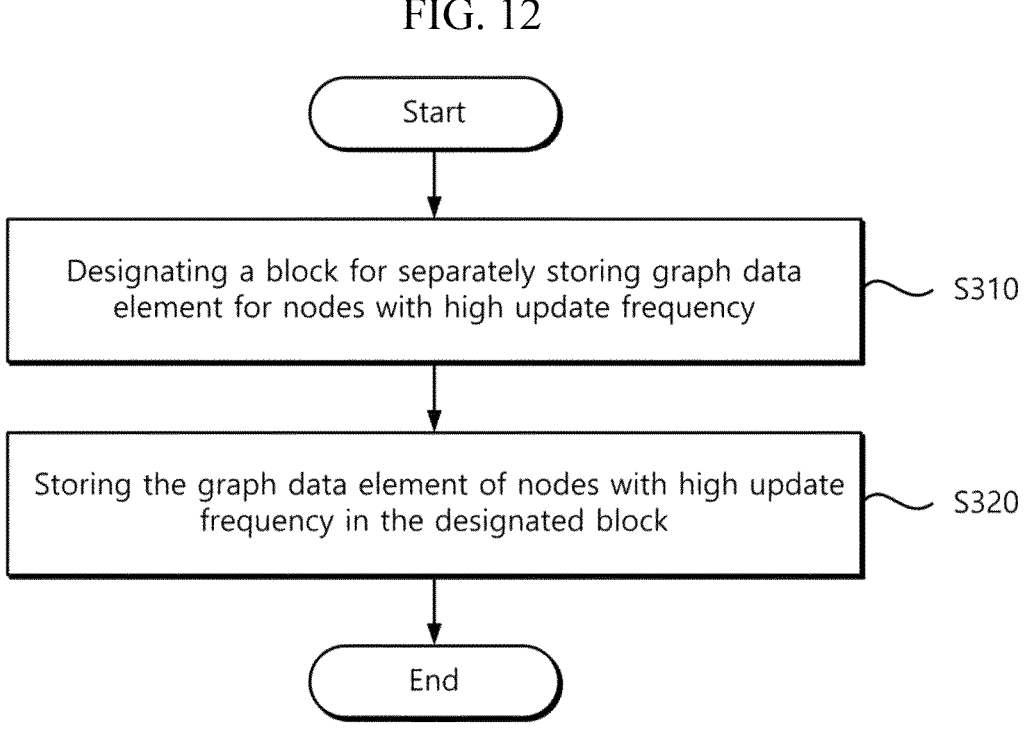
FIG. 12 is a flowchart that illustrates a method of operating a computational storage device, according to another embodiment of the present disclosure.

FIG. 12 is a flowchart illustrating a method of operating a computational storage device, according to another embodiment of the present disclosure.

Referring to FIG. 12, in S310, the computational storage device 100 designates a block for separately storing graph data elements of a node having a high update frequency. For example, the block may be designated based on the update frequency of graph data elements, the size of a page, block, and/or super block included in the NVM 140, etc.

In S320, the computational storage device 100 stores the graph data element of the node having a high update frequency in the designated block. Thereafter, when the graph data element of the node stored in the designated block is updated, the computational storage device 100 may store the updated graph data element in another page (e.g., a reserved area) included in the designated block.

Hereinafter, embodiments to which the above-described computational storage device 100 may be applied will be described. Detailed description of overlapping parts will be omitted to avoid redundancy.

Figure 13:
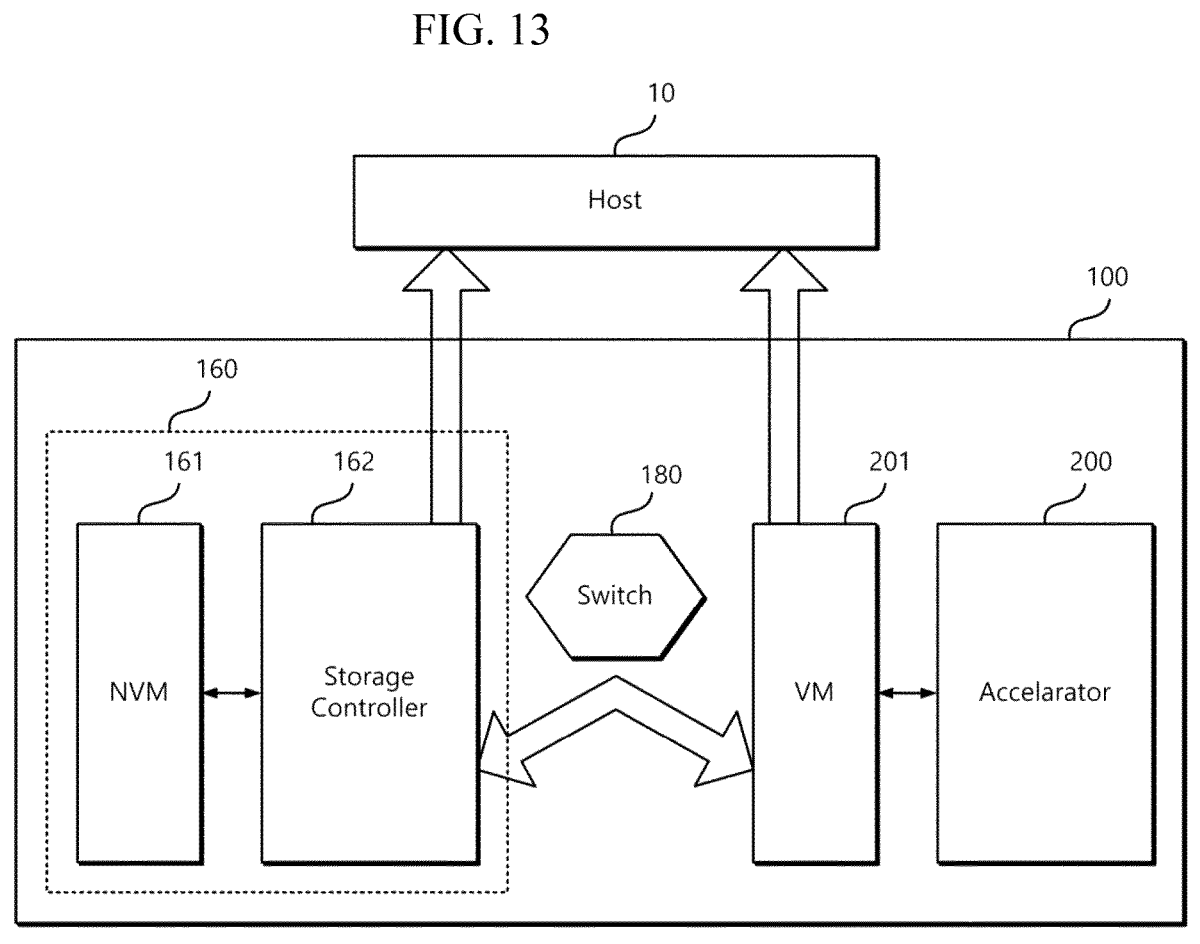

FIG. 13 is a diagram illustrating a computational storage device, according to another embodiment of the present disclosure.

Referring to FIG. 13, the computational storage device 100 according to an embodiment is connected to a host 10, and includes a storage device 160, a switch 180, and an accelerator 200.

The storage device 160 may be an internal memory embedded in the computational storage device 100. For example, the storage device 160 may be a solid state drive (SSD), an embedded universal flash storage (UFS) memory device, or an embedded multi-media card (eMMC). In some embodiments, the storage device 160 may be an external memory that is detachable from the electronic device. For example, the storage device 160 may be a UFS memory card, a Compact Flash (CF), a Secure Digital (SD), a MicroSecure Digital (Micro-SD), a Mini Secure Digital (Mini-SD), an extreme Digital (xD), or a memory stick.

The storage device 160 may include an NVM 161 and a storage controller 162, and the storage controller 162 may be configured to generate input data used to perform an operation requested by the host 10 based on a command, or may generate input data through reading from the NVM 161.

The switch 180 is connected between the storage device 160 and the accelerator 200 and may be, for example, a PCIe switch conforming to a Peripheral Component Interconnect express (PCIe) standard. The switch 180 may be configured to establish communication between the storage device and a buffer memory 201 connected to the accelerator 200 and may perform communication according to the PCIe protocol.

The accelerator 200 may be configured to perform an acceleration function that assists the computation of the host 10 by performing some of the computations performed by the host 10. For example, the accelerator 200 is connected to the storage device 160 to receive input data from the storage device 160, may be configured to perform a computation on the input data to generate computation data, and may be configured to store the generated computation data in the buffer memory 201 or may be configured to transfer the generated computation data to the storage device 160. The accelerator 200 may perform the above-described computation operations (e.g., clustering, GNN, etc.) in response to a command of the host 10.

The accelerator 200 may be a reconfigurable and reprogrammable logic chip for offloading the operation of the host 10, for example, may be an FPGA (Field Programmable Gate Array), an MCU (micro controller unit), a PLD (Programmable Logic Device), or a complex PLD (CPLD).

The buffer memory 201 may be configured to store computation data according to the computation from the accelerator 200. Alternatively, according to an embodiment, the buffer memory 201 may be configured to store system data offloaded from the host 10. The buffer memory 201 may be a volatile memory, such as a DRAM or an SRAM. The computation data stored in the buffer memory 201 may be stored in the NVM 161 included in the storage device 160.

In the computational storage device 100 of FIG. 13, the control module 120 of FIG. 2 as described above may be the storage controller 162 or the accelerator 200 according to embodiments. According to embodiments, the storage controller 162 or the accelerator 200 may perform various operations of the above-described control module 120.

Storage System

Figure 14:
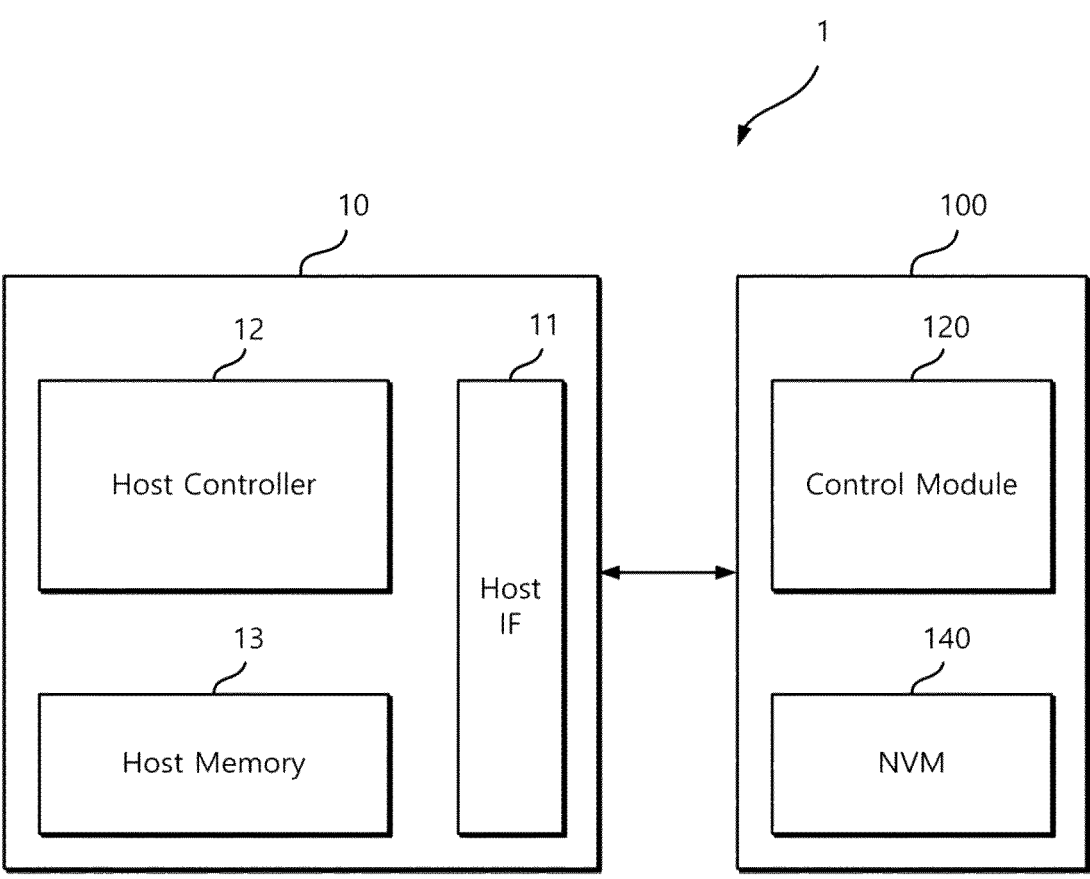
FIG. 14 is a diagram that illustrates a storage system, according to an embodiment of the present disclosure.

FIG. 14 is a diagram illustrating a storage system, according to an embodiment of the present disclosure.

Referring to FIG. 14, a storage system 1 according to an embodiment includes the host 10 and the computational storage device 100 connected to the host 10.

The host 10 includes a host interface 11, a host controller 12, and a host memory 13.

The host interface 11 providing an interface with the computational storage device 100 may include a physical layer and a link layer. The physical layer may include physical components for exchanging data with the computational storage device 100, and may include at least one transmitter TX and at least one receiver RX. The link layer may manage data transmission and/or composition, and may manage data integrity and error.

The host controller 12 may be configured to control the operation of the host 10. For example, the host controller 12 may be configured to execute operating system (OS). The operating system may include, for example, a file system for file management and a device driver for controlling peripheral devices including the computational storage device 100 at the operating system level. For example, the host controller 12 may include any processor such as a central processing unit (CPU).

The host memory 13 may store instructions and data executed and processed by the host controller 12. The host memory 13 may be implemented as a memory having a relatively high operating speed. For example, the host memory 13 may include a volatile memory such as a DRAM.

According to an embodiment, when the computational storage device 100 includes only the NVM 140 and does not separately include a volatile memory such as the DRAM (e.g., various removable external memories), the control module 120 may access the host memory 13 through the host interface 11 according to a Host Performance Booster (HPB) technique or a Host Memory Buffer (HMB) technique. The HPB technique means that the host memory 13 is used as a cache memory of the computational storage device 100 by storing various data related to the operation of the computational storage device 100 in the host memory 13 included in the host 10.

Accordingly, the control module 120 may be configured to store data (e.g., updated graph data elements, etc.) generated according to the above-described various computational operations in the host memory 13 or may be configured to read the stored data to perform the above-described computational operations such as the GNN. In this case, when the control module 120 reads the data stored in the host memory 13 and stores the data in the NVM 140, according to an embodiment, the control module 120 may store the first graph data element GDE 1 having a high degree of association in the first memory area 141 included in the NVM 140, and may store the second graph data element GDE 2 having a low degree of association in the second memory area 142.

In other embodiments, the control module 120 may store a graph data element having a high update frequency in a designated block among a plurality of blocks included in the NVM 140, according to an embodiment.

Figure 15:
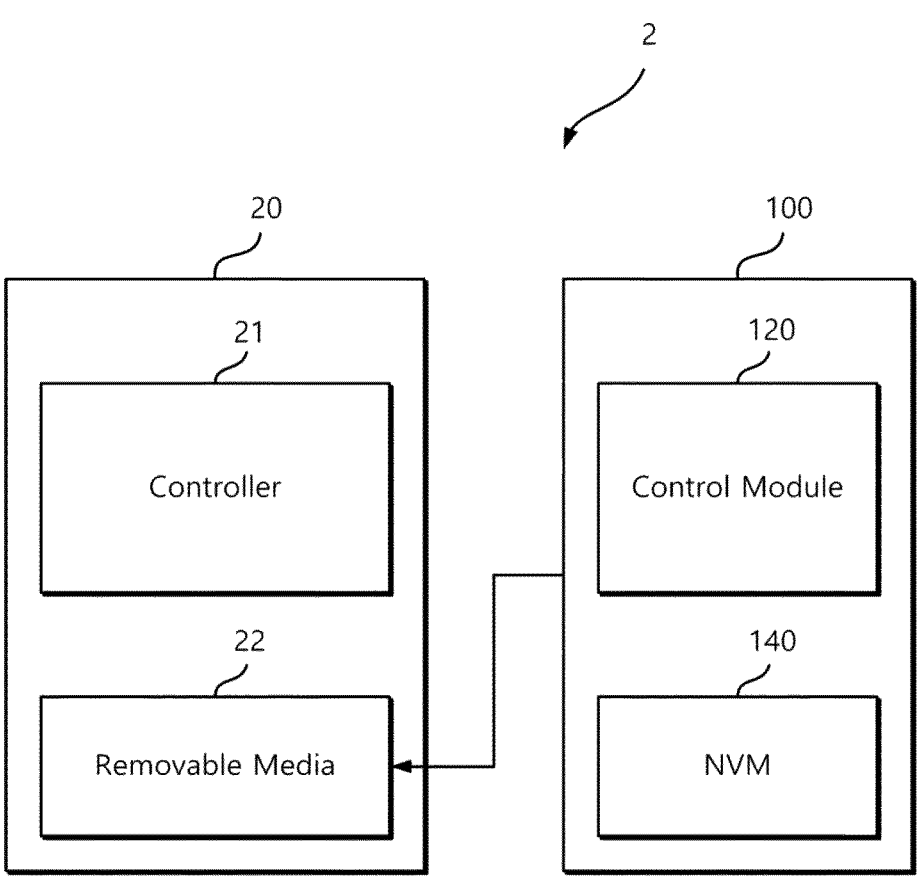
FIG. 15 is a diagram that illustrates a storage system, according to another embodiment of the present disclosure.

FIG. 15 is a diagram illustrating a storage system, according to another embodiment of the present disclosure.

Referring to FIG. 15, a storage system 2 according to another embodiment includes an external device 20 and the computational storage device 100.

The external device 20 may include various devices such as a mobile phone, a smart phone, a tablet, a personal computer (PC), a laptop computer, a personal digital assistant (PDA), a portable multimedia player (PMP), a surveillance camera, a digital camera, a camcorder, a portable game console, a music player, a video player, a navigation device, a wearable device, an Internet of Things (IoT) device, an e-book, a virtual reality (VR) device, and an augmented reality (AR) device, by way of example.

The external device 20 may include a controller 21 for controlling the operation of the external device 20 and a removable media 22. The removable media 22 may be a storage medium in which various data, software, applications and/or programs are stored, and may update various operations or functions performed by the controller 21 or may add new functions. For example, when the external device 20 is a surveillance camera, and when the removable media 22 are configured to perform video analysis in real time according to an artificial neural network, a corresponding function may be additionally performed.

The removable media 22 may be replaced by the computational storage device 100 according to various embodiments of the present disclosure. That is, the computational storage device 100 may be newly inserted into the external device 20. When the computational storage device 100 is inserted into the external device 20, various operations such as graph processing and artificial intelligence training, as described above, may be performed. According to an embodiment, the computational storage device 100 may perform the function (e.g., in the case of a surveillance camera, operations such as an image pattern, object identification, an alert generation, etc.) of the external device 20 using the GNN, and may store the graph data elements according to the GNN in the NVM 140. When the control module 120 stores the data in the NVM 140, according to an embodiment, the control module 120 may store the first graph data element GDE 1 having a high degree of association in the first memory area 141 included in the NVM 140, and may store the second graph data element GDE 2 having a low degree of association in the second memory area 142.

In other embodiments, the control module 120 may store a graph data element having a high update frequency in a designated block among a plurality of blocks included in the NVM 140, according to an embodiment.

Figure 16:
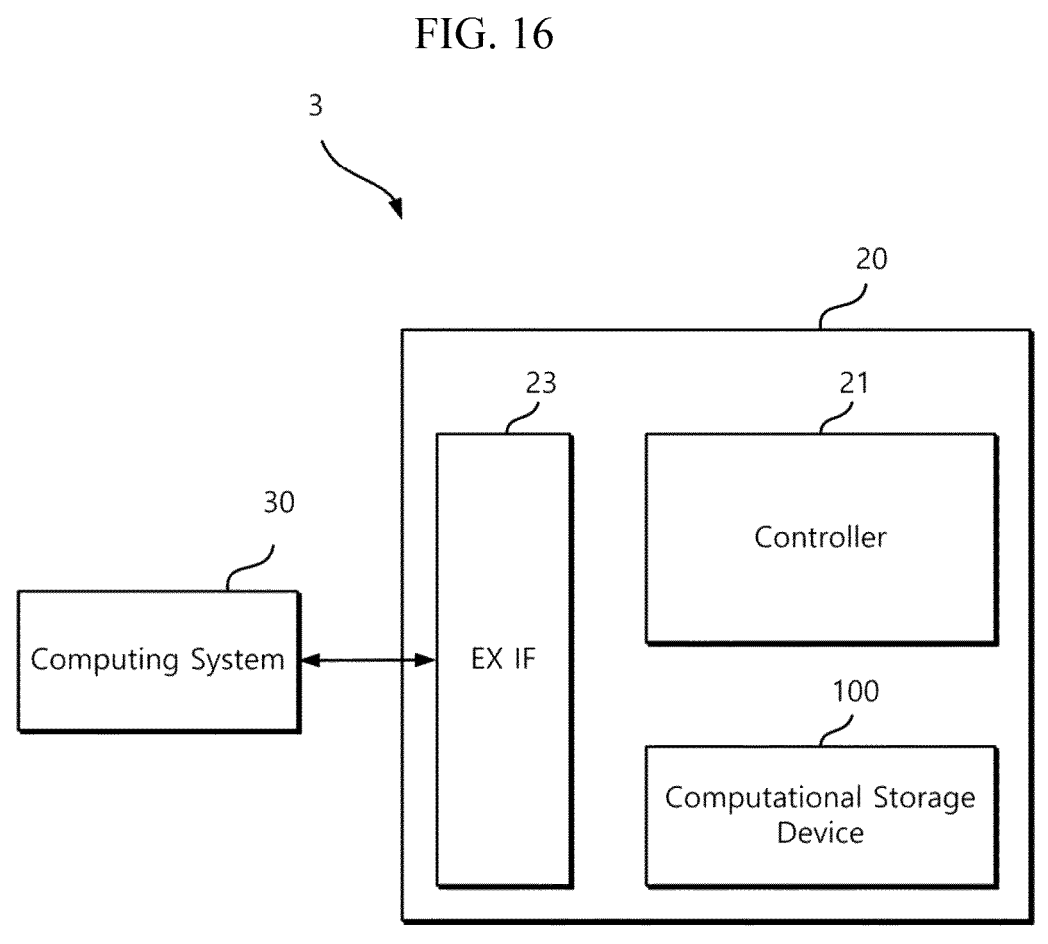

FIG. 16 is a diagram illustrating a storage system, according to another embodiment of the present disclosure.

Referring to FIG. 16, the removable media 22 of the external device 20 according to FIG. 15 may be replaced with the computational storage device 100 according to various embodiments of the present disclosure. The external device 20 includes an external interface 23 in addition to the controller 21 and the computational storage device 100. The external interface 23 may be provided to allow the external device 20 to communicate with another separate computing system 30.

The computing system 30 may be configured to perform various computation operations associated with the external device 20 separately from the computational storage device 100. The computational storage device 100 may be connected to the computing system 30 through the external interface 23 to exchange various data according to graph processing or artificial intelligence training, to offload a part of the computational operations, or to be offloaded.

For example, the external interface 23 may be a CXL interface. The CXL interface is a computer device interconnect specification, and is an interface that reduces the overhead and latency of the hosts 10 and the storage devices in heterogeneous computing environments due to the rapid innovation of specialized workloads such as data compression and encryption, and artificial intelligence, and that allows host memory 13 to share a memory space with a memory device. For example, the computing system 30 may directly communicate with the control module 120 included in the computational storage device 100 that performs a complex computation and may share a memory.

In the storage systems 1, 2, and 3 according to the above-described various embodiments, the external device may perform at least some of functions performed by an edge end (e.g., an edge server, etc.) in various network systems including existing external devices, or the external device may directly perform various computation functions such as the GNN.

In one embodiment, the network system may include a cloud server and at least one storage system. For example, a cloud server can be a data center. For example, the storage system may be any one of the storage systems 1, 2, and 3 according to the above-described embodiments. The storage system may transmit and receive data to and from the cloud server.

In one embodiment, the storage system may include at least one edge server and at least one external device. At least one edge server and/or at least one external device may perform at least part of the functions performed by the cloud server. Alternatively, at least one external device may perform at least part of a function performed by at least one edge server. For example, at least one function may include graph processing and artificial intelligence learning according to the above-described embodiments.

In one embodiment, a graph processing operation performed by a storage system comprises storing a first graph data element of a plurality of graph data elements, the plurality of graph data elements comprising a plurality of nodes and a plurality of edges that connect at least a portion of the plurality of nodes to each other, having a relatively high degree of association with one node of the plurality of nodes in a first memory area, and storing a second graph data element of the plurality of graph data elements having a relatively low degree of association with the one node of the plurality of nodes in a second memory area having a read speed different from that of the first memory area.

According to an embodiment of the present disclosure, a computational storage device capable of artificial intelligence operation and data storage based the characteristics of a nonvolatile memory, a storage system including the same, and a method of operating the same may be provided.

The above descriptions are specific embodiments for carrying out the present disclosure. Embodiments in which a design is changed simply or which are easily changed may be included in the present disclosure as well as an embodiment described above. In addition, technologies that are easily changed and implemented by using the above embodiments may be included in the present disclosure. While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A computational storage device comprising:
   a control module; and
   a nonvolatile memory connected to the control module, and configured to store a plurality of graph data elements, which comprises a plurality of nodes and a plurality of edges that connect at least a portion of the plurality of nodes to each other, in a plurality of memory areas each having a plurality of blocks, and
   wherein the control module is configured to:
   train an artificial intelligence model based on the plurality of graph data elements; and
   store a graph data element of the plurality of graph data elements in a designated block of the plurality of blocks based on training of the artificial intelligence model and an update frequency of the graph data element.

2. The computational storage device of claim 1, wherein the control module is further configured to:
   store a graph data element of the plurality of graph data elements in at least one reservation page included in the designated block based on training the artificial intelligence model.

3. The computational storage device of claim 1, wherein the designated block is included in a one memory area of the plurality of memory areas.

4. The computational storage device of claim 1, wherein the artificial intelligence model is a GNN (Graph Neural Network) model.

5. The computational storage device of claim 1, wherein the control module is further configured to:

designate the designated block based on an update frequency of the graph data elements, the plurality of blocks, and/or a plurality of pages included in each of the plurality of blocks.

6. The computational storage device of claim 1, wherein the control module performs a garbage collection for the designated block when the designated block is full.

7. The computational storage device of claim 6, wherein the garbage collection is block-based operation.

8. The computational storage device of claim 1, wherein the designated block is designated in multiples.

9. The computational storage device of claim 1, wherein the graph data element is a first data graph element having a first update frequency, the control module stores a second graph data element of the plurality of graph data elements having a second update frequency in a remaining block of the plurality of blocks based on training of the artificial intelligence model, and the first update frequency is higher than the second update frequency.

10. The computational storage device of claim 1, wherein the designated block is designated through a host connected to the computational storage device.

11. A method of operating a computational storage device, the method comprising:

training an artificial intelligence model based on a plurality of graph data elements comprising a plurality of nodes and a plurality of edges that connect at least a portion of the plurality of nodes to each other; and storing a graph data element of the plurality of graph data elements in a designated block of a plurality of blocks based on training of the artificial intelligence model and an update frequency of the graph data element.

12. The method of claim 11, further comprising:

storing a graph data element of the plurality of graph data elements in at least one reservation page included in the designated block based on training the artificial intelligence model.

13. The method of claim 11, further comprising:

designating the designated block based on an update frequency of the graph data elements, the plurality of blocks, and/or a plurality of pages included in each of the plurality of blocks.

14. The method of claim 11, further comprising:

performing a garbage collection for the designated block when the designated block is full.

15. The method of claim 14, wherein the garbage collection is block-based operation.

16. The method of claim 11, wherein the designated block is designated in multiples.

17. The method of claim 11, wherein the graph data element is a first data graph element having a first update frequency, and the method further comprising:

storing a second graph data element of the plurality of graph data elements having a second update frequency in a remaining block of the plurality of blocks based on training of the artificial intelligence model, and the first update frequency is higher than the second update frequency.

18. The method of claim 11, wherein the designated block is designated through a host connected to the computational storage device.

19. A network system comprising:

a storage system that performs one or more graph processing operations; and a cloud server connected to the storage system and transmitting and receiving data related to the one or more graph processing operations, wherein the one or more graph processing operations comprise:

training an artificial intelligence model based on a plurality of graph data elements comprising a plurality of nodes and a plurality of edges that connect at least a portion of the plurality of nodes to each other, and storing a graph data element of the plurality of graph data elements in a designated block of a plurality of blocks based on training of the artificial intelligence model and an update frequency of the graph data element.

20. The network system of claim 19, wherein the artificial intelligence model is a GNN (Graph Neural Network) model.

* * * * *